Nov. 19, 1957 I. HELLER 2,813,373

TOY RADIO STATION, TELEPHONE AND SIGNALING SYSTEM

Filed March 7, 1955 3 Sheets-Sheet 1

INVENTOR.
Isaac Heller,
BY
Harry [signature],
ATTORNEY

Nov. 19, 1957 I. HELLER 2,813,373

TOY RADIO STATION, TELEPHONE AND SIGNALING SYSTEM

Filed March 7, 1955 3 Sheets-Sheet 2

INVENTOR.

BY Isaac Heller,

Harry Bobook, ATTORNEY

TOY RADIO STATION, TELEPHONE AND SIGNALING SYSTEM

Filed March 7, 1955

INVENTOR.
Isaac Heller,
BY
Harry Rebook
ATTORNEY

United States Patent Office 2,813,373

Patented Nov. 19, 1957

2,813,373

TOY RADIO STATION, TELEPHONE, AND SIGNALING SYSTEM

Isaac Heller, Maplewood, N. J., assignor to Robin Hood Co., Newark, N. J., a corporation of New Jersey Application March 7, 1955, Serial No. 492,489

7 Claims. (Cl. 46—227)

This invention relates to a toy for stimulating the imagination of a child and at the same time providing amusement, and one object of the invention is to provide a novel combination of some of the features of a radio station, some features of a telephone system and some features of an audible signal system, for example a buzzer or a telegraph sounder or clicker, and a visible signal system such as a flashing light, and novel and improved means for selectively bringing said features into play.

Another object of the invention is to provide in such a toy, a new combination of a telephone system including two combination transmitter and receiver units, and an audible signaling device connected in an electric circuit with a power source and a controlling switch, whereby upon operation of said switch, said audible signaling device can be operated or energized to simulate the sending of a message from a radio station and at the same time the sound can be transmitted to said telephone units to serve as a signal.

A further object is to provide in such a combination, an audible signaling device including a vibrating part, and a pointer mounted on and rotated by said vibrating part to simulate, for example, a radio signal detector or wave length indicator.

A still further object is to provide in a toy of the character described, a dirigibly mounted electric lamp connectible in circuit with said controlling switch, whereby, for example, a child may selectively first operate the controlling switch to sound the audible signal, for example in simulation of the International Morse Code, and immediately thereafter cause a flashing of the light by continued operation of the controlling switch, and also turn the lamp.

Other objects are to provide a toy of the character described which shall be simple and inexpensive in construction and easy to operate; and to obtain other advantages and results that will be brought out by the following description in conjunction with the accompanying drawings, in which.

Figure 1:
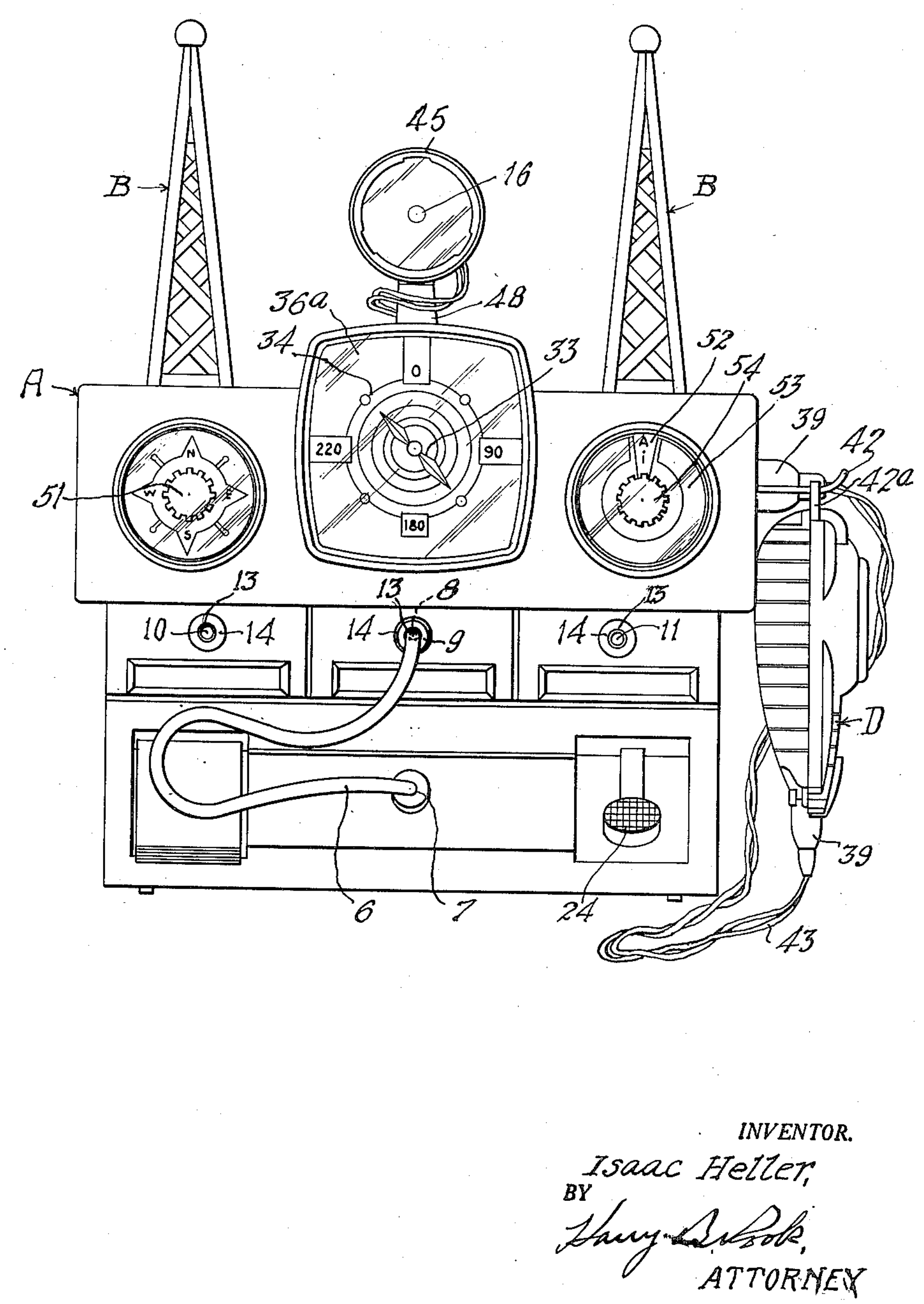
Figure 1 is a front elevational view of a toy simulation of a combined radio station, telephone and signaling system constructed in accordance with the invention.
Figure 2:
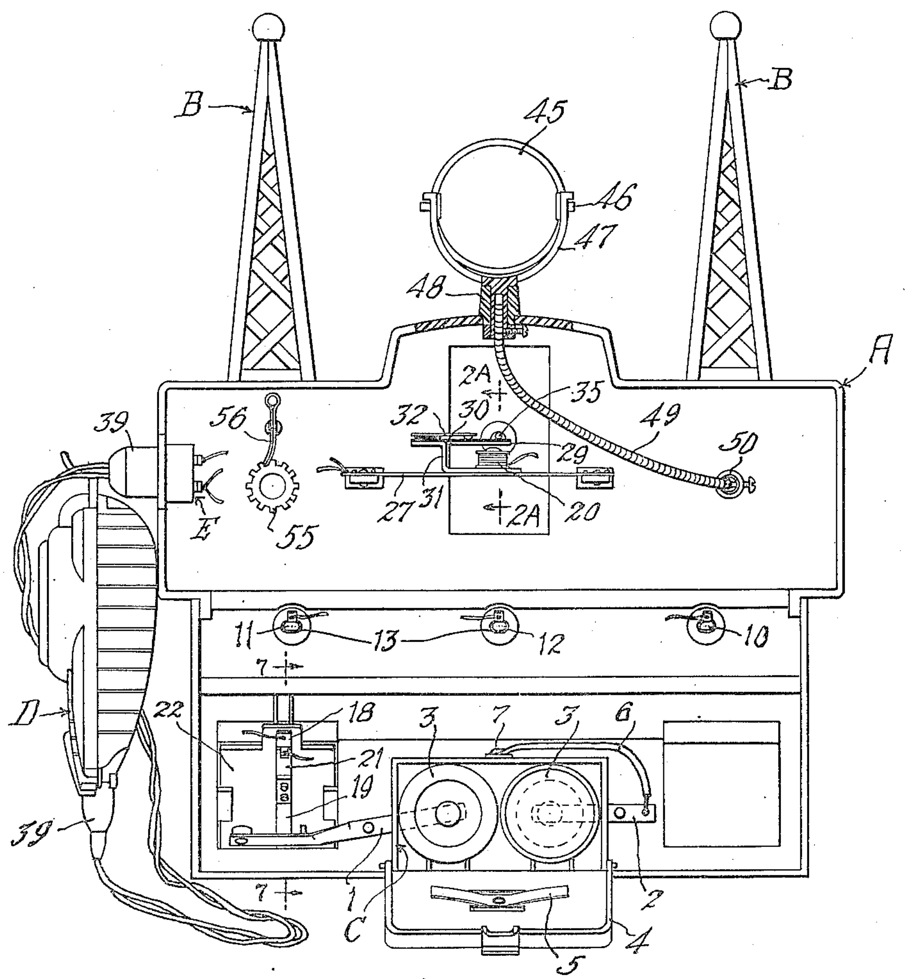
Figure 2 is a rear elevational view thereof with the back cover plate removed and with portions broken away and shown in section.
Figure 2A:
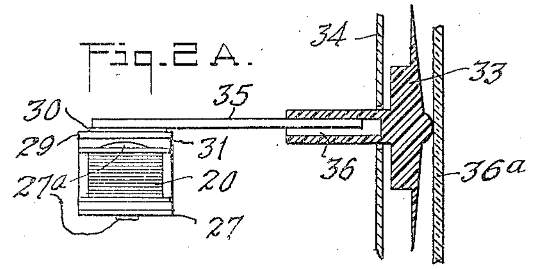
Figure 2A is a greatly enlarged fragmentary transverse vertical sectional view approximately on the plane of the line 2A—2A of Figure 2.
Figures 3, 4, 5, 6, 7, 8, 9:
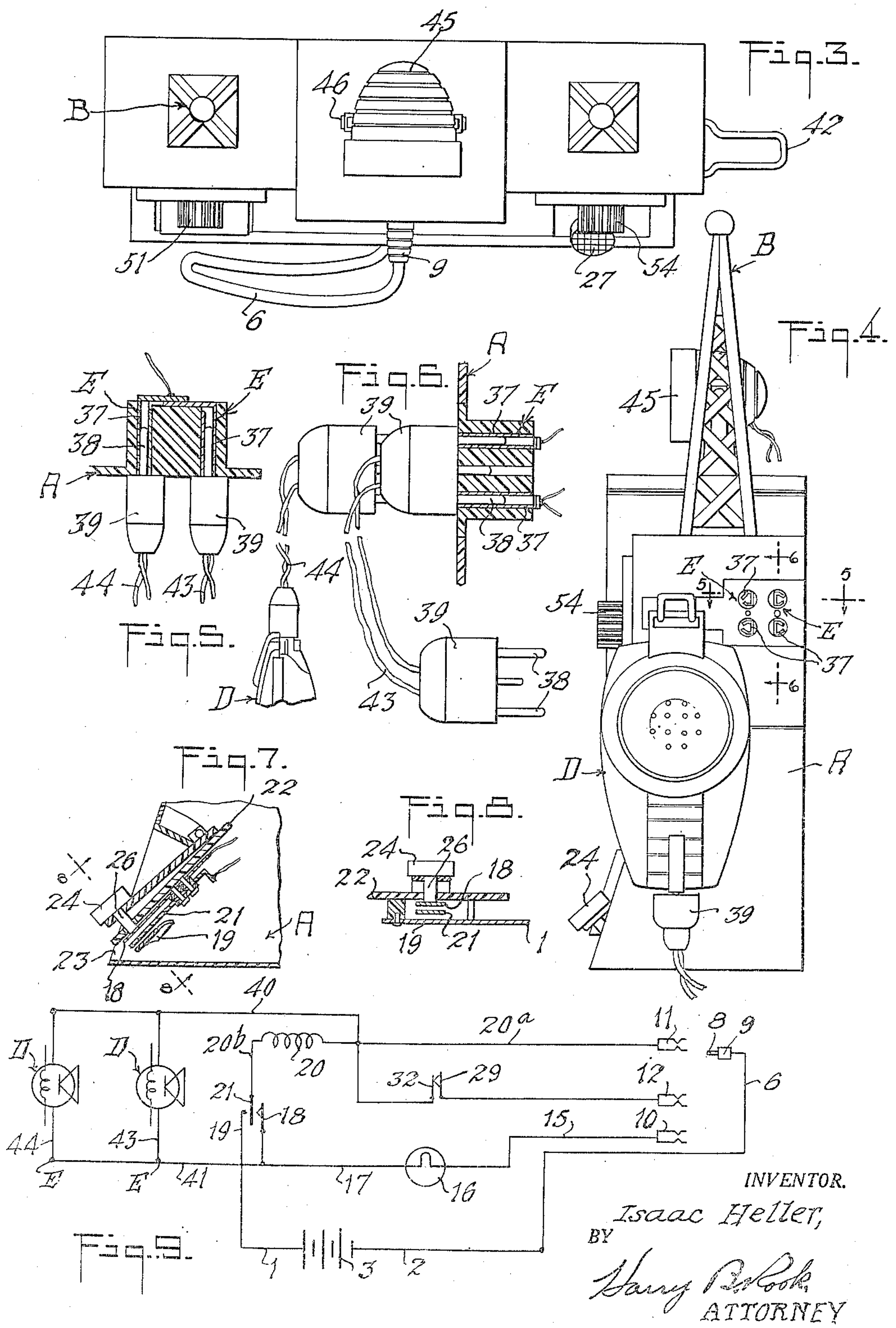
Figure 3 is a top plan view of the toy.
Figure 4 is an elevational view of one end of the toy.
Figure 5 is an enlarged fragmentary horizontal sectional view approximately on the plane of the line 5—5 of Figure 4.
Figure 6 is an enlarged fragmentary vertical sectional view approximately on the plane of the line 6—6 of Figure 4.
Figure 7 is a fragmentary vertical sectional view approximately on the plane of the line 7—7 of Figure 2.
Figure 8 is a fragmentary horizontal sectional view on the plane of the line 8—8 of Figure 7.
Figure 9 is a wiring diagram of the electrical circuit of the toy.

Specifically describing the illustrated embodiment of the invention, the toy comprises a main casing A that may be conveniently and inexpensively molded from a plastic composition and preferably has mounted thereupon one or more simulations B of radio antennas. Within the main casing A are two spring terminal elements 1 and 2 of a power source which in the present instance comprises two dry battery cells 3 arranged within an auxiliary casing C within the main casing. Said auxiliary casing has a hinged cover 4 carrying a double ended spring contact strip 5, and the cells are arranged in the casing with the positive terminal of one cell in contact with one of the terminal elements and the negative terminal of the other cell in contact with the other terminal element, the other terminals of said cells being electrically connected by the contact strip 5. The terminal elements and contact strip are of course insulated from each other, in this instance by being mounted in spaced relation on the main casing and auxiliary casing which are formed of electrical insulating plastic material. One of the terminal elements, in the present instance the element 2, has one end of a flexible wire or cord 6 electrically connected thereto and said cord extends through an opening 7 in the front wall of the casing and has a plug connector element 8 connected to its other end and provided with a finger grip 9 whereby the plug connector can be manually manipulated or moved with respect to the main casing.

Mounted in the front wall of the main casing are a plurality of electrical connector elements 10, 11 and 12, each of which is shown as comprising a metal sleeve 13 forming a socket secured in a bushing 14 that is mounted in the casing wall with one end of the sleeve projecting from the rear side of the front wall of the casing A.

One of these socket elements, in the present instance the element 10, is connected by a wire 15 to one terminal of an electric incandescent lamp 16, the other terminal of which is connected by a wire 17 to one spring contact element 18 of an electric switch. Said switch includes a stationary contact element 19 that is connected to the terminal element 1 of the power source. The socket connector element 11 is connected by a wire **20*a* to one terminal of an induction coil 20, the other terminal of which is connected by a wire 20*b* to a third switch contact element 21 that is disposed between the switch contact elements 18 and 19. Each of the elements 18 and 21 is a spring strip and has one end fixedly connected to one end of the other, and said ends of both said strips are fixedly connected to a plate 22 of insulating material that is mounted on the inner side of the front wall of the main casing and is exposed through an opening 23 in said wall. The contact elements 18, 19 and 21 are normally disposed in spaced and parallel relation to each other; and a switch operating lever or key 24 that may be formed of plastic material has one end fast connected to said plate 22 and its other end provided with a stud 26 that extends through an opening in said plate, and is normally inherently spring biased away from the contact element 18. When said key is pressed in one direction toward the plate 22, the contact element 18 is first forced into engagement with the element 21 whereupon the element 21 is pressed into contact with the element 19** so that the switch contact elements are in circuit closing positions. Upon release of the key, the contact elements spring back to their normal spaced relation into circuit-opening positions.

The induction coil 20 is mounted on a metallic supporting bracket 27 that is fastened to the inner side of the front wall of the main casing, the coil having a metallic core in the form of a rivet by which the coil is mechanically and electrically connected to said bracket 27; and the wire 20*a* is connected to said bracket. Cooperating with the coil is an armature 29 that has one end connected by a spring strip 30 to a post 31 on which is also mounted, in insulated relation thereto, a buzzer contact element 32 into contact with which the armature is normally actuated by the spring 30.

The armature 29 cooperates with a pointer 33 that is rotatable over a dial 34 on the face of the front wall of the main casing and as shown the armature has a pivot pin or rod 35 fixedly connected thereto and loosely disposed within a socket 36 in the central hub portion of the pointer so that the pointer will rotate about said pivot pin. Suitable means is provided for holding the pointer against displacement from the pin, such means in the present instance being a transparent plate 36*a* fixedly mounted in the casing in spaced opposed relation to the dial to be abutted by the pointer for preventing movement of the pointer off the pin. When the armature is rapidly vibrated, the pointer is rapidly rotated in one direction or the other, apparently due to the normal eccentric relation of the pointer to the pivot pin and the rapid lateral movement of the pin alternately in opposite directions.

The toy also includes two combination telephone transmitter and receiver units D each of which may be substantially the same as the sound powered combination transmitter and receiver unit described in United States Patent No. 2,536,179 granted to Isaac Heller. Each unit has two socket terminals to separably cooperate with a pin plug element.

These telephone units are separably electrically connected in parallel circuit with each other and with the induction coil 20 when the switch is closed. As shown, two pairs E of telephone socket connector elements are mounted in one end wall of the casing in insulated relation to each other, each pair comprising two metallic sleeves 37 each to separably receive one of the pins 38 of a plug connector 39. One sleeve of each pair is connected by a wire 40 to the corresponding sleeve of the other pair and to the bracket 27 (i. e., one terminal of the coil 20 of the induction coil), while the other sleeves of said pairs are electrically connected to each other and to a wire 41 that electrically connects the wire 17 and the corresponding terminal of the lamp 16 to the switch contact element 18.

One of the telephone units is the local unit and may be normally suspended on a hook 42 projecting from the end of the wall of the main casing by means of a loop 42*a* on the telephone unit. The terminals of said local unit have cooperating therewith one plug connector 39, which is connected to one end of a two wire cord 43 at the other end of which is connected another plug connector that is separably attached to one pair of the telephone connector elements E. The other telephone unit has connected to its terminals another plug connector on the end of a long two wire cord 44 at the other end of which is another plug connector 39 separably attached to the other pair of telephone connector elements. The cord 44 may be, for example, fifty feet long so that the phone connected thereto may be carried to a point remote from the casing A; and conversation can be effected through the two phones.

Generally the coils in the telephone units will be of high impedance, for example twelve ohms, while the induction coil 20 will be of low impedance, for example one ohm.

The electric lamp 16 is shown as dirigibly mounted on the casing, being fitted into a lamp housing 45 that is pivotally mounted on horizontal pivots 46 in a forked bracket 47 the shank of which is rotatably mounted in a bearing sleeve 48 which is secured in the top of the main casing A. One end of a flexible shaft 49 is fixedly connected to said shank of the fork and the other end of the shaft is fast connected to the tubular shaft 50 of an actuating knob 51 which is journaled in an opening in the front wall of the casing, whereby upon rotation of the knob, the lamp housing can be rotated about a vertical axis.

In operation of the toy, the child can select to operate either the searchlight, the telegraph clicker or sounder, or the telegraph buzzer, by inserting the plug connector 8 into the proper socket connector 10, 11 or 12 and then actuating the key 24. When the phones are connected in the circuit, the click or the buzz, as the case may be, will be heard on both phones because the phones are in parallel with the buzzer induction coil 20 when the switch is closed. The three-element controlling switch ensures against shunting of the telephones by the buzzer coil when the switch key is in normal position, thereby permitting the clear transmission of voice sounds over the phones. The buzzer or the clicker can be used both to simulate outgoing radio broadcasts or signals and at the same time serve as calling signals for the telephones. The buzzer also causes rotation of the pointer 33 when the circuit through the buzzer is closed so as to further stimulate the imagination of the child.

Other units may be provided, such as a disk 52 having the International Morse Code symbols thereon that are individually visible through a notch in a dial plate 53 upon rotation of the disk by a knob 54 journaled in the casing wall. The knob may have a toothed portion 55 on the inner side of the casing to cooperate with a flexible strip 56 for producing a light clicking sound upon rotation of the disk and for indexing the disk to bring the code symbols into proper register with the slot. The child may visually ascertain the code for each letter exposed through the notch and then operate the buzzer or clicker to make the proper dot and dash signs.

It will be understood by those skilled in the art that the specific structural details have been shown primarily to illustrate the principles of the invention and that the details of construction may be modified and other devices may be included in the toy within the spirit and scope of the claims.

What I claim is:

1. A toy comprising a casing, a plurality of electrically energizable devices including a searchlight housing and an electric lamp therein, means dirigibly mounting said searchlight housing on said casing, an electrical audible signal means in said casing including an induction coil and an armature and a buzzer contact element therefor, an electrical power source, an electrical switch including an operating lever and a plurality of normally open switch contact elements closable by movement of said lever in one direction, a pointer, means loosely rotatably mounting said pointer on said armature to provide for rotation of said pointer upon vibration of said armature, a plurality of stationary electrical connector elements for said lamp, for said induction coil, and for all of said coil and said armature and said buzzer contact element, respectively, a manually manipulatable electrical connector element to separably mechanically and electrically connect selectively with said stationary connector elements, and means connecting said switch contacts, said lamp, said induction coil, said armature and said buzzer contact in circuit with said power source, said stationary connector elements and said manipulatable connector element, to provide selectively for flow of electric power through said electric lamp, said induction coil, and simultaneously through said induction coil, said armature and said buzzer contact element, upon movement of said switch lever in said one direction while said manipulatable connector element is connected with the corresponding said stationary connector elements.

2. The toy as defined in claim 1 with the addition of two sound powered combination telephone transmitter and receiver units, and means connecting said units in parallel circuit with said induction coil whereby conversation can be effected through said units when said circuits through said devices are broken and a clicking sound can be heard in said units when only said circuit through said induction coil is closed and a buzz-like sound can be heard in said units when the circuits through both said induction coil and said buzzer contact element are closed.

3. A toy comprising a casing, an electrical power source having first and second terminals of opposite polarity respectively, a wire connected at one end to the first terminal and having a manually manipulatable electrical connector element at its other end, a plurality of stationary identical electrical connector elements mounted on said casing, said manually manipulatable connector element and each of said stationary connector elements being constructed to provide for mechanical and electrical separable connection of said manually manipulatable connector element selectively with said stationary connector elements, a plurality of electrically energizable devices each having two terminals one of which terminals is electrically connected to each of said stationary connector elements, a switch including an operating lever and a plurality of switch contact elements one of which switch contact elements is connected to the second terminal of said power source while each of the other switch contact elements is electrically connected to the other terminal of one of said devices to control a circuit through the corresponding said devices and said power source, said operating lever and said contact elements providing for making and breaking all of said circuits upon movement of said operating lever in opposite directions, respectively, one of said devices including an induction coil whose first-mentioned and second-mentioned terminals are connected respectively to one of said stationary connector elements and to one of said switch contact elements, and a coactive armature normally spring biased away from said coil and connected to another of said stationary connector elements, and a buzzer contact element having two terminals with one terminal connected to said induction coil and the other terminal adapted to be engaged and disengaged by said armature upon deenergization and energization of said induction coil, respectively, whereby upon insertion of said manually manipulatable electrical conductor element selectively into said stationary connector elements, a buzzing sound and a clicking sound, respectively, may be produced by actuation of the operating lever of said witch.

4. A toy as defined in claim 3 wherein one of said devices includes an electric lamp having two terminals one of which is connected to a third one of said stationary connector elements and the other of which is connected through said switch to one terminal of said power source when the switch is closed, said electric lamp being energizable by insertion of said manually manipulatable connector element into said third stationary connector element.

5. A toy as defined in claim 3 with the addition of two pairs of stationary telephone connector elements mounted in said casing and connected in parallel circuit, one telephone connector element of each pair being connected to the first-mentioned terminal of said induction coil while the other telephone connector element of each pair is connected to the second-mentioned terminal of said lamp and one sound powered combination telephone transmitter and receiver unit for each pair of stationary telephone connector elements, each unit having two terminals each separably connected to each telephone connector element of the corresponding pair, whereby conversation can be effected through said units when said circuits through said devices are broken and a clicking sound can be heard in said units when only said circuit through said induction coil is closed and a buzz-like sound can be heard in said units when only said circuit through said induction coil is closed and a buzz-like sound can be heard in said units when the circuits through both said induction coil and said buzzer contact element are closed.

6. A toy as defined in claim 5 wherein said switch contact elements normally are disposed in spaced parallel relation so that each is adapted to engage the next adjacent element to close the circuit, and one thereof is directly engaged by said operating lever upon movement of the lever in one direction to make said circuits, and the second mentioned telephone connector element is connected to the last-mentioned switch contact element.

7. The combination as defined in claim 3 with the addition of a dial on said casing, a pointer having a pivot opening therein and a pin on said armature concentric with said dial and loosely disposed in said opening to rotatably support said pointer for movement relatively to said dial, whereby said pointer will be rotated upon rapid vibration of said armature.

References Cited in the file of this patent

UNITED STATES PATENTS

| | | |
|---|---|---|
| 1,020,030 | Elliott | Mar. 12, 1912 |
| 1,518,845 | Foley et al. | Dec. 9, 1924 |
| 1,826,105 | Veale | Oct. 6, 1931 |
| 2,362,214 | Morch | Nov. 7, 1944 |
| 2,481,686 | Roggenstein | Sept. 13, 1949 |
| 2,574,905 | Bonnano | Nov. 13, 1951 |
| 2,628,101 | Prentice | Feb. 10, 1953 |
| 2,664,665 | Rozenoff | Jan. 5, 1954 |